Figure 1:
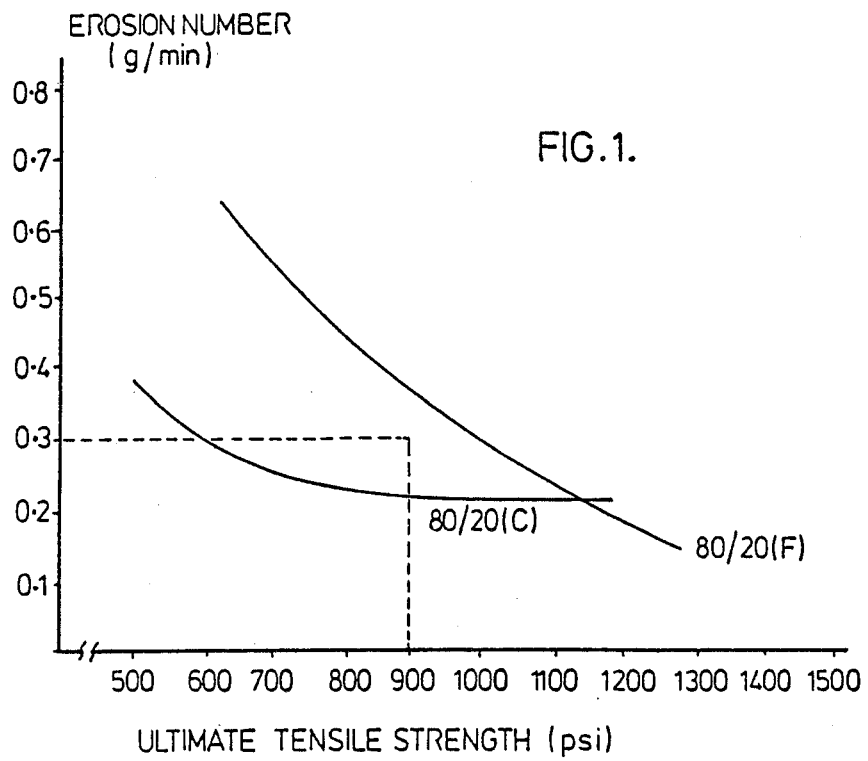

United States Patent [19]

Adamovic

[11] 4,374,173
[45] * Feb. 15, 1983

[54] COMPOSITE POWDERS SPRAYABLE TO FORM ABRADABLE SEAL COATINGS

[75] Inventor: Emilija Adamovic, Willowdale, Canada

[73] Assignee: Sherritt Gordon Mines Limited, Toronto, Canada

[*] Notice: The portion of the term of this patent subsequent to Sep. 22, 1998, has been disclaimed.

[21] Appl. No.: 212,781

[22] Filed: Dec. 4, 1980

Related U.S. Application Data

[62] Division of Ser. No. 91,870, Nov. 6, 1979, Pat. No. 4,291,089.

[51] Int. Cl.³ .............................. B05D 1/10; B32B 5/16
[52] U.S. Cl. .................................. 428/325; 428/328; 428/338; 428/403; 428/404; 428/450; 427/217; 427/423; 427/422; 427/216; 427/305
[58] Field of Search ............... 428/404, 325, 472, 403, 428/450; 427/305

[56] References Cited

U.S. PATENT DOCUMENTS

| | | | |
|---|---|---|---|
| 3,540,896 | 11/1970 | Flicker | 428/472 |
| 3,607,343 | 9/1971 | Longo et al. | 428/404 |
| 3,914,507 | 10/1975 | Fustukian | 428/404 |
| 3,975,165 | 8/1976 | Elbert et al. | 428/472 |
| 4,249,913 | 2/1981 | Johnson et al. | 428/404 |
| 4,291,089 | 9/1981 | Adamovic | 428/325 |

FOREIGN PATENT DOCUMENTS 2815876 11/1978 Fed. Rep. of Germany.

Primary Examiner—P. Ives
Attorney, Agent, or Firm—Robert F. Delbridge; Arne I. Fors

[57] ABSTRACT

A composite powder sprayable by thermal spraying onto a substrate to form an abradable seal coating, is composed of particles each having a core of non-metallic solid material surrounded by a layer of nickel-chromium-aluminum alloy containing from about 4 to about 8% and from about 2 to about 6% aluminum.

22 Claims, 3 Drawing Figures

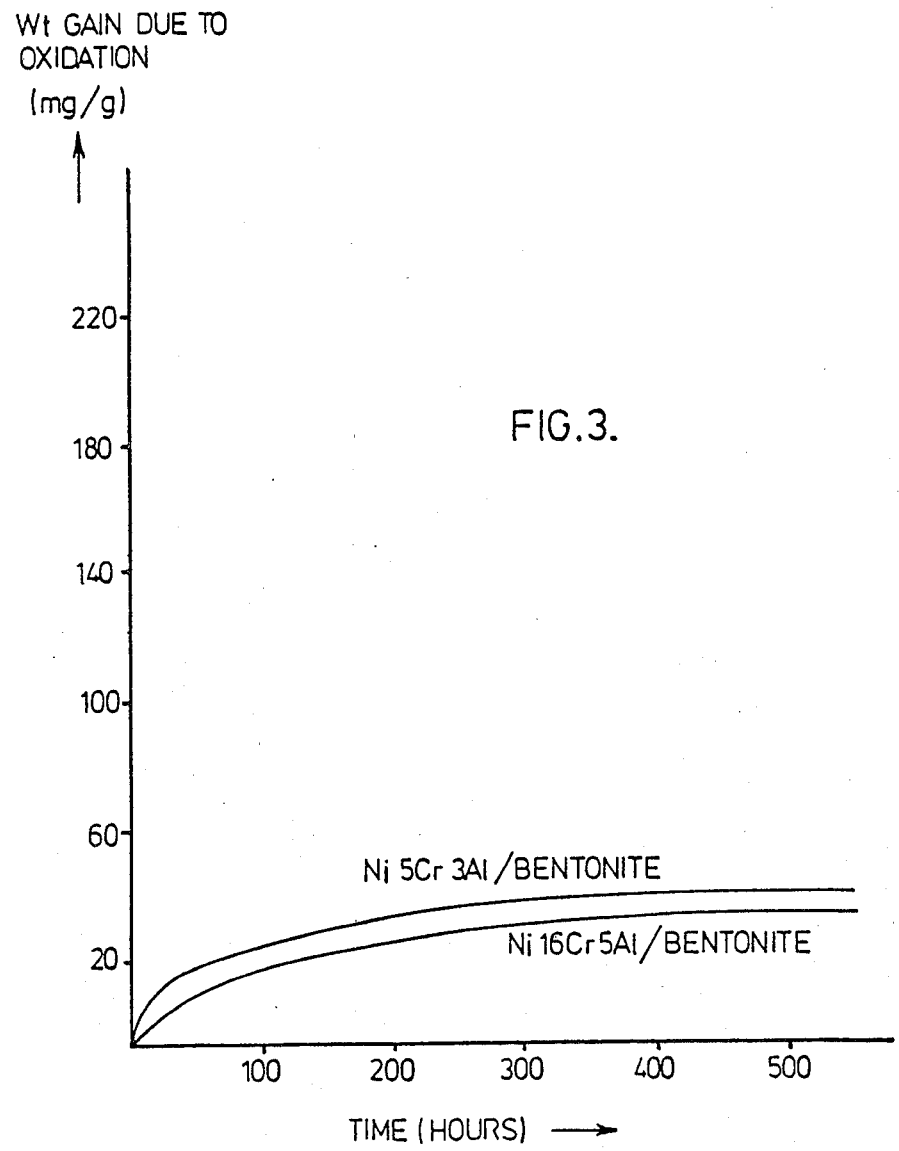

COMPOSITE POWDERS SPRAYABLE TO FORM ABRADABLE SEAL COATINGS

This application is a division of Ser. No. 091,870, filed Nov. 6, 1979, now U.S. Pat. No. 4,291,089.

This invention relates to thermal spray powders, that is to say powders which are sprayed by thermal spraying such as flame spraying onto a substrate to form a coating on the substrate to provide desired surface properties.

One use of such powders is to form a coating on a substrate to provide an abradable seal, that is to say a coating which seals the space between the substrate and an adjacent surface movable relative thereto, and which is abraded to a controlled extent by relative movement between the substrate and the adjacent surface. Such a seal is initially formed by thermal spraying a powder onto the substrate to form a coating with a slightly greater thickness than the spacing between the substrate and the adjacent surface, so that the coating is abraded by relative movement between the substrate and the adjacent surface to a slightly lesser thickness corresponding to the spacing between the substrate and the adjacent surface so as to provide an efficient seal therebetween. Such seals are used for example on turbine or compressor blades of gas turbine engines, such as those used in aircraft, to provide a seal between the blades and the turbine or compressor housing.

One of the problems in providing a suitable abradable seal is to produce a thermally sprayed coating which, on the one hand has sufficient structural strength which nevertheless is low enough to provide abradability, and which, on the other hand, has a sufficiently high resistance to erosion by particles impinging on the abradable seal coating during use. For example, in the case of gas turbine or compressor blades, the seal coating is subjected to impingement by abrasive particles entrained in the air and ingested by the engine.

Powders used to form abradable seal coatings usually include a metallic material to provide sprayability, structural strength and erosion resistance, and a non-metallic solid material to directly or indirectly provide structural weakness, that is to say abradability, in the seal coating. The non-metallic solid material should have good lubricity, that is to say good low friction properties, and preferably also good heat insulating properties. The non-metallic solid material may be ceramic material.

The properties of an abradable seal coating depend not only on the physical and chemical nature of the powder but also on the conditions under which the thermal spraying process is carried out. The interaction between the physical and chemical properties of the powder and the spraying conditions is complex. For example, the basic variables involved with respect to the powder are the melting point, surface tension and specific surface area of the powder particles, all of which variables affect the degree to which a powder particle will be melted for a given heat input and also affect the configuration in which the particles are deposited on the substrate, for example with lamellar or spherical shape. Another variable is the heat input during spraying which is mainly controlled by varying the amount of gas combusted and/or the velocity of the powder travelling through the flame or plasma in the thermal spray.

In one type of powder used to form abradable seal coatings, each powder particle has a central core of non-metallic solid material surrounded by a layer of metallic material, as described for example in U.S. Pat. No. 3,914,507. Such powders are known as composite powders, with the powder particles being known as composite powder particles. One composite powder of this kind which has been suggested has particles each having a core surrounded by nickel or nickel alloy, and abradable seal coatings formed by thermal spraying such powders have been found to be potentially useful as abradable seal coatings on compressor or turbine blades of aircraft gas turbine engines.

For thermal spraying to provide abradable seal coatings, at least about 95% of the particles should be less than about 150 microns (100 mesh Tyler equivalent) in size, since conventional thermal spray equipment can only satisfactorily spray powder with particles conforming to this size limitation. Conventionally, when spraying composite powder to form an abradable seal, it has been the practice to use powders with particle sizes conforming to this size limitation, and with at least 70% by weight of the particles being less than 75 microns (200 mesh) since it has been believed that such a size distribution was required to produce an abradable seal coating with satisfactory properties.

It has now been discovered that a markedly improved combination of abradability and erosion resistance is obtained if nickel or nickel alloy composite powder has from about 50 to about 90% by weight, and preferably from about 55 to about 65%, of its particles greater in size then about 75 microns. Also, there should be less than about 10%, and preferably less than about 5% of the particles with a size below 45 microns (325 mesh). This relatively coarse powder can be sprayed with conventional thermal spray equipment, and the lower specific area of the coarser powder of the present invention allows less heat transfer into each particle during spraying so that less melting and/or superheating of the nickel or nickel alloy occurs. This encourages the deposition of the composite alloy particles on a substrate in substantially spherical form rather than lamellar form, and this in turn reduces the contact area between individual powder particles in the seal coating, thereby increasing the abradability.

Further, since composite powder with particle sizes in accordance with the invention allows only a limited heat transfer into each particle during spraying, the powder of the present invention is less sensitive to inadvertent errors during the spraying operation than the prior art finer powders so far as minor variations of desired spraying conditions affecting heat input are concerned.

The ratio of nickel or nickel alloy to non-metallic central core is preferably in the range of from about 78:22 to about 90:10, preferably in the range of from about 80:20 to about 80:18.

The nickel alloy may be nickel-chromium-aluminum (NiCrAl) alloy.

Although NiCrAl composite powder has previously been proposed for use in connection with prior art finer powders for forming abradable seal coatings, it has been found that the abradability of seal coatings formed from such powder tends to decrease when the seal coatings have been subjected to typical operating temperatures of an aircraft gas turbine engine, that is to say from about 650° C. up to about 850° C. It has been believed that this loss of abradability was due to the gradual oxidation of the metallic content of the seal coating, which the oxides functioning to increase the strength of the bonds between metallic particles in the seal coating, and hence decrease abradability.

According to the prior art, this tendency has been overcome so far as possible by forming the NiCrAl alloy with percentages of nickel, chromium and aluminum which tend to produce an alloy with the best oxidation resistance, a typical such composition containing 79% nickel, 16% chromium and 5% aluminum by weight. Although this solution has alleviated the problem to some extent, the rate of loss of abradability of the seal coating formed from such NiCrAl composite powder at temperatures of the order mentioned above has still been unacceptably high.

In accordance with a further feature of this invention, it has now been unexpectedly found that this problem is substantially overcome if chromium is present at a value in the range of from about 4% to about 8%, preferably from about 4.5% to about 6%, and the aluminum is present at a value in the range of from about 2% to about 6%, preferably from about 3% to about 5%.

Although the reason for the improved abradability of a seal coating formed from a powder of such a metallic composition is not clear, it is believed that the reason may be connected with the nature of the small but significant amount of oxidation of the metallic content of the seal coating at the temperatures concerned. It is believed that the oxides formed by an alloy having a composition in accordance with the invention increase the strength of the bonds between the metallic particles to a much less extent than the oxides formed by an alloy of high oxidation resistance as mentioned above.

Abradable seal coatings made from powder in accordance with this further feature of the invention exhibit oxidation resistance and coating integrity (that is to say freedom from spalling) similar to that of conventional oxidation resistant alloys up to about 850° C. Unintentional presence of up to about 1% silicon and/or up to about 1% iron in the NiCrAl alloy may have an important influence in this aspect of the coating performance.

It has also been found that a further advantage of this feature of the present invention is that such a chromium and aluminum content produces a favourable surface tension effect during thermal spraying which enables a seal coating of very desirable abradability to be formed. Abradability is favoured by the deposition of the composite powder onto a substrate in a substantially spherical rather than lamellar form. It would have been expected that, since the presence of the alloying elements chromium and aluminum in the nickel lowers the melting point, the composite powder particles would tend to be present in lamellar form in the seal coating. It has been found that this is not the case, and it is believed that the amounts of chromium and aluminum in accordance with this feature of the invention produce a surface tension effect which assists in causing the particles in the seal coating to be substantially spherical rather than lamellar.

As mentioned earlier, it is preferable that the non-metallic core material be ceramic, and suitable core materials in this respect are bentonite and rhyolite. Also, each core preferably consists of a single core particle.

Figure 2:
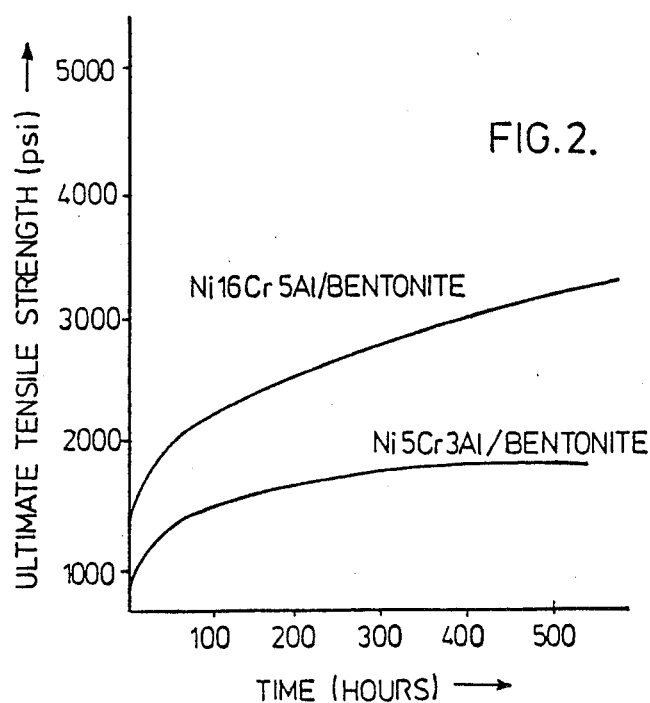

Embodiments of the invention will now be described, by way of example, with reference to the accompanying drawings, of which:

FIG. 1 shows a graph of erosion number against ultimate tensile strength for abradable seal coatings formed from a coarser powder in accordance with the invention and formed from a finer powder in accordance with the prior art, FIG. 2 shows a graph indicating the change in ultimate tensile strength with time at 800° C. for a seal coating formed from a powder with a NiCrAl composition in accordance with the present invention and a seal coating formed from a powder with a NiCrAl composition in accordance with the prior art, and FIG. 3 shows a graph indicating the amount of oxidation found in the abradable seal coatings with which FIG. 2 is concerned.

NiCrAl/bentonite powder having a weight ratio of NiCrAl to bentonite of 80:20 was produced by coating bentonite core particles with nickel in a manner as described in U.S. Pat. No. 3,062,680, such that each bentonite core particle was coated with a layer of nickel, the bentonite core particle sizes being less than 150 microns (100 mesh). The nickel/bentonite powder was then alloyed with chromium and aluminum in a manner as described in U.S. Pat. No. 3,914,507 to form a NiCrAl composition of 92% nickel, 5% chromium and 3% aluminum.

The NiCrAl/bentonite powder was then screened to produce a powder product with the size distribution of its particles in accordance with the invention, as follows:

| Microns | Mesh (Tyler) | Wt % |
| --- | --- | --- |
| >150 | +100 | Trace |
| 105–150 | −100/+150 | 15.0 |
| 88–105 | −150/+170 | 27.2 |
| 75–88 | −170/+200 | 19.0 |
| 63–75 | −200/+250 | 12.0 |
| 53–63 | −250/+270 | 14.8 |
| 45–53 | −270/+325 | 10.0 |
| <45 | −325 | 2.0 |

It will be noted that 61.2% of the particles are greater in size than 75 microns (200 mesh).

Various abradable seal coatings were deposited on the ends of mild steel cylinders (substrates) with a diameter of one inch (2.54 cm) by flame spraying this powder with a Metco 6P flame spray gun and a Metco type 3NP powder feed unit with the following process parameters:

| Nozzle | P7A-M |
| --- | --- |
| Oxygen | |
| Flow, % | 40–45 |
| Pressure, psig (kPa$_G$) | 21 (145) |
| Acetylene | |
| Flow, % | 40–45 |
| Pressure, psig (kPa$_G$) | 15 (103.5) |
| Nitrogen (Carrier gas) | |
| Flow, % | 37 |
| Pressure, psig (kPa$_G$) | 55 (379.5) |
| Powder feed wheel | S |
| Powder feed rate, g/min | 55 |
| Cooling air nozzle | 6P-3 |
| Cooling air pressure, psig (kPa$_G$) | 30 (207) |
| Gun-to-Substrate distance, in (cm) | 8.5 (21.6) |

In each case, the substrate (cylinder) was stationary, the gun being traversed across the end of the cylinder at a rate of 590 in/min (X direction) and movement in the Y direction being 0.25 in/pass. For different substrates, the oxygen content and acetylene content was varied within the indicated ranges to obtain different combinations of abradability and erosion resistance. The thickness of the coating produced in each case was 0.08 inch.

The ultimate tensile strength of each coating was measured by gluing the end of an uncoated cylinder to the surface of the coating, and pulling the two cylinders apart in a tensile machine until the coating fractured. This ultimate tensile strength (UTS) test is used as an indication of abradability, as is customary in the art. A lower UTS value indicates better abradability.

The erosion resistance of each coating was measured by impinging a constant quantity of silica sand onto the coating for one minute, and the consequent weight loss was recorded to indicate the propensity for erosion in terms of an erosion number.

The values of the erosion number and ultimate tensile strength are indicated by the line marked 80/20(C) in FIG. 1, with the dotted line showing target values of erosion number and ultimate tensile strength for abradable seal coatings on turbine blades of a typical aircraft gas turbine engine. It will be noted that such coatings can readily be provided with erosion number and abradability within the target values.

For comparison purposes, NiCrAl/bentonite powder was produced in the same manner as described above, except that the powder was screened to produce a powder product with a particle size distribution in accordance with the prior art, as follows:

| Microns | Mesh (Tyler) | Wt (%) |
|---------|--------------|--------|
| >150    | +100         | Trace  |
| 105-150 | -100/+150    | 5.4    |
| 88-105  | -150/+170    | 8.8    |
| 75-88   | -170/+200    | 17.8   |
| 63-75   | -200/+250    | 10.0   |
| 53-63   | -250/+270    | 24.6   |
| 45-53   | -270/+325    | 22.8   |
| <45     | -325         | 10.6   |

It will be noted that 68% of the particles had a size *less* than 75 microns.

Abradable seal coatings were then formed in the same manner as described above, and their erosion number and ultimate tensile strength measured as before. The results are shown in FIG. 1 by the line marked 80/20(F), and clearly shows that it was not possible to achieve the target values of erosion resistance and abradability.

A number of abradable seal coatings were then formed from NiCrAl/bentonite powder in accordance with the invention and in the manner described above, and with the NiCrAl alloy containing 5% chromium and 3% aluminum. For comparison purposes, a further number of abradable seal coatings were formed in the same way, except that the NiCrAl alloy contained 16% chromium and 5% aluminum.

Abradable seal coatings of both kinds were maintained at a temperature of about 800° C. in air for a number of hours, and the ultimate tensile strength of a coating of each kind was measured from time to time in the manner previously described. The gain in weight of the seal coatings was also measured, the gain in weight being an indication of the amount of oxidation of the metallic content.

The results are shown in FIGS. 2 and 3. FIG. 2 shows the increase in ultimate tensile strength of the abradable seal coatings over a 500 hour period. It will be noted that the increase in ultimate tensile strength, which represents decrease in abradability of the Ni5Cr3Al/bentonite seal coating is much lower than that of the Ni16Cr5Al/bentonite seal coating. Further, the increase in ultimate tensile strength of the Ni5Cr3Al/bentonite seal coating substantially ceases after about 200 hours, whereas the ultimate tensile strength of the Ni16Cr5Al/bentonite seal coating continues to increase.

Also, the initial ultimate tensile strength of the Ni5Cr3Al/bentonite seal coating is less than that of the Ni16Cr5Al/bentonite seal coating, and this is believed to be due at least partly to a beneficial surface tension effect of the chromium/aluminum composition in accordance with the preferred feature of the present invention.

FIG. 3 shows that the Ni5Cr3Al/bentonite seal coating is in fact oxidized to a slightly greater extent than the Ni16Cr5Al/bentonite seal coating. As indicated earlier, it is believed that the smaller increase in abradability with time of the Ni5Cr3Al/bentonite seal coating is due to the formation of weaker oxides than those produced by the Ni16Cr5Al/bentonite seal coating.

Other ceramic materials, such as rhyolite, may be used as the core material if desired.

Other embodiments within the scope of the invention will be readily apparent to a person skilled in the art, the scope of the invention being defined in the appended claims.

What I claim as new and desire to protect by Letters Patent of the United States is:

1. A composite powder sprayable by thermal spraying onto a substrate to form an abradable seal coating, said powder comprising particles each having a core of non-metallic solid material surrounded by a layer of nickel-chromium-aluminum alloy containing from about 4 to about 8% by weight chromium and from about 2 to about 6% by weight aluminum.

2. A composite powder according to claim 1 wherein the nickel-chromium-aluminum alloy contains from about 4.5 to about 6% by weight chromium and from about 3 to about 5% by weight aluminum.

3. A composite powder according to claim 1 wherein the ratio of the nickel-chromium-aluminum alloy to non-metallic material by weight is in the range of from about 78:22 to about 90:10.

4. A composite powder according to claim 3 wherein the ratio of nickel-chromium-aluminum alloy to non-metallic material by weight is in the range of from about 80:20 to about 82:18.

5. A composite powder according to claim 1 wherein the nickel-chromium-aluminum alloy also contains up to about 1% by weight silicon.

6. A composite powder according to claim 1 wherein the nickel-chromium-aluminum alloy also contains up to about 1% by weight iron.

7. A composite powder according to claim 1 wherein each particle has a core of heat insulating material.

8. A composite powder according to claim 7 wherein each particle has a core of ceramic material.

9. A composite powder according to claim 8 wherein each particle has a core of bentonite.

10. A composite powder according to claim 8 wherein each particle has a core of rhyolite.

11. A composite powder according to claim 1 wherein each core consists of a single core particle.

12. An abradable seal assembly comprising an abradable seal coating carried by a substrate, said abradable seal coating having been deposited on the substrate by thermal spraying a composite powder comprising particles each having a central core of non-metallic solid material surrounded by a layer of nickel-chromium-aluminum alloy containing from about 4 to about 8% by weight chromium and from about 2 to about 6% by weight aluminum.

13. An abradable seal assembly according to claim 12 wherein the abradable seal coating has been deposited on the substrate by thermal spraying a composite powder with the nickel-chromium-aluminum alloy containing from about 4.5 to about 6% chromium and from about 3 to about 5% by weight aluminum.

14. An abradable seal assembly according to claim 12 wherein the abradable seal coating has been deposited on the substrate by thermal spraying a composite powder with a ratio of nickel-chromium-aluminum alloy to non-metallic material by weight of each particle being in the range of from about 78:22 to about 90:10.

15. An abradable seal assembly according to claim 14 wherein the abradable seal coating has been deposited on the substrate by thermal spraying a composite powder with the ratio of nickel-chromium-aluminum alloy to non-metallic material by weight of each particle being in the range of from about 80:20 to about 82:18.

16. An abradable seal assembly according to claim 12 wherein the abradable seal coating has been deposited on the substrate by thermal spraying a composite powder with the nickel-chromium-aluminum alloy also containing up to about 1% by weight silicon.

17. An abradable seal assembly according to claim 12 wherein the abradable seal coating has been deposited on the substrate by thermal spraying a composite powder with the nickel-chromium-aluminum alloy also containing up to about 1% by weight iron.

18. An abradable seal assembly according to claim 12 wherein the abradable seal coating has been deposited on the substrate by thermal spraying a composite powder with the non-metallic core material being heat insulating material.

19. An abradable seal assembly according to claim 18 wherein the abradable seal coating has been deposited on the substrate by thermal spraying a composite powder with the non-metallic core material being ceramic material.

20. An abradable seal assembly according to claim 19 wherein the abradable seal coating has been deposited on the substrate by thermal spraying a composite powder with the non-metallic core material being bentonite.

21. An abradable seal assembly according to claim 19 wherein the abradable seal coating has been deposited on the substrate by thermal spraying a composite powder with the non-metallic core material being rhyolite.

22. An abradable seal assembly according to claim 12 wherein the abradable seal coating has been deposited on the substrate by thermal spraying a composite powder wherein each core consists of a single core particle.

* * * * *